March 16, 1937. H. D. STECHER 2,073,909

METHOD OF ATTACHING COUPLINGS TO HOSE ENDS

Original Filed June 24, 1933

Inventor
HENRY D. STECHER
Richey + Watts
Attorney

Patented Mar. 16, 1937

2,073,909

UNITED STATES PATENT OFFICE 2,073,909

METHOD OF ATTACHING COUPLINGS TO HOSE ENDS

Henry D. Stecher, Lakewood, Ohio, assignor to The Weatherhead Company, Cleveland, Ohio, a corporation of Ohio Original application June 24, 1933, Serial No. 677,421, now Patent No. 2,002,839, dated May 28, 1936. Divided and this application January 23, 1935, Serial No. 3,078

5 Claims. (Cl. 29—88.2)

This invention relates to methods of attaching hose couplings to hose ends. This application is a division of my copending application Serial No. 677,421, filed June 24, 1933, and patented May 28, 1936, No. 2,002,839, and in its preferred form this application relates especially to a method of securing a hose having a metallic or fabric lining to a coupling.

In connection with couplings such as are employed in high pressure oil hoses for motor cars and for automobile gasoline lines, difficulties have arisen because of the fact that the fluid carried by the hose has been able to reach the cut end of the hose and thus penetrate the fabric covering of the hose or the fabric which may be incorporated in the hose construction. The difficulties have been particularly pronounced in connection with hoses of the types embodying spiral metallic or braided fabric linings and a rubber or rubber and fabric covering, where it is impossible to make a pressure seal with the interior of the hose. In such hoses, the fluid may follow the convolutions of the metallic lining or the interstices of the fabric and thus reach the cut end of the hose. Unless the end of the hose is properly sealed, the fluid may escape through the outer fabric covering, or penetrate the fabric embodied in the walls of the hose and thus damage the hose.

Accordingly, it is among the objects of my invention to provide a hose coupling and a method of attaching a hose to the coupling which will prevent fluid from penetrating or escaping around the end of the hose. Another object of my invention is to provide a secure, permanent, leak proof, and economical connection between a hose and coupling. A further object is to provide a method of joining a coupling to a hose having a spiral metallic or woven fabric lining, which will effect a permanent mechanical joint and a leak proof fluid joint. Another object is to provide a method which can be carried out rapidly and economically. Other objects of my invention will be apparent from the following description of a preferred form thereof, reference being had to the accompanying drawing. The essential characteristics are summarized in the claims.

Figure 1:
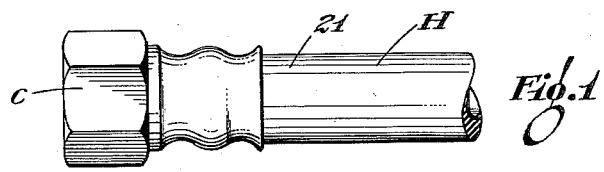
Figure 1 illustrates a complete coupling made according to my invention.
Figure 2:
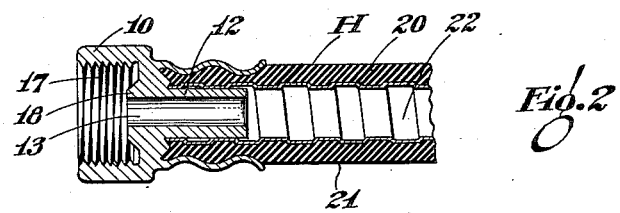
Fig. 2 is a longitudinal section through the hose and coupling illustrated in Fig. 1.
Figure 3:
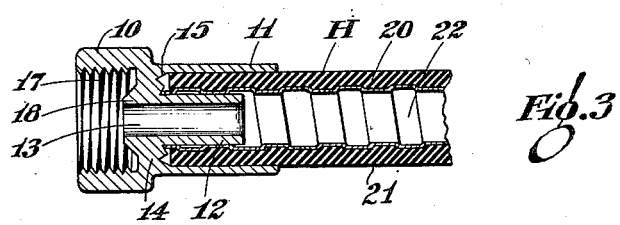
Fig. 3 illustrates the first step in securing a hose to my coupling, the hose merely being inserted into the sleeve of the coupling.

As shown in the drawing, the coupling C comprises a body portion 10 having projecting therefrom a sleeve 11 which is preferably integrally formed therewith or permanently joined thereto. Extending from the body portion in the same direction as the sleeve and concentric therewith, I preferably provide a nipple 12 which is adapted to extend into the interior passageway of the hose H and which may have a passageway 13 therein. The nipple and the sleeve together form an annular chamber which is adapted to receive the end of the hose. The bottom of the annular chamber is defined by the end wall 14 of the body portion of the coupling. The end wall is preferably provided with a V-shaped annular recess 15 for a purpose to be hereinafter described.

The body portion of the coupling at the end opposite the sleeve and nipple may be provided with any convenient means for connecting the coupling to a part of a motor car or to a copper tube. For example, as illustrated in the drawing, the coupling may be provided with an internally threaded recess 17 having a conical seat at the base thereof and adapted for connection to a flared copper tube. This type of seat and the formation of the recess in the coupling is fully described in the Weatherhead Patent No. 1,733,925 and will not be discussed further herein.

In the drawing, the hose H is illustrated as having a rubber or other non-metallic body 20, a fabric covering 21, and a spirally wound internally disposed flexible metallic sheath or lining 22 with or without a layer of fabric between the metallic sheath and the rubber body. It is to be understood, however, that my invention is equally applicable to fabric lined hose or other types of hose.

In order to make a secure mechanical joint between the hose and the coupling and likewise to produce a fluid tight joint between the hose and the coupling and prevent fluid from escaping past the end of the hose, I preferably spin or roll the sleeve of the coupling into engagement with the hose somewhat in the manner disclosed in Patent No. 2,000,680, issued May 7, 1935, to Albert J. Weatherhead, Jr. In that patent there is disclosed a coupling similar to the one illustrated herein except that the end wall of the body portion of the coupling against which the end of the hose abuts is plane, and a method of spinning or rolling in the sleeve to compress the hose between the sleeve and the nipple and to crowd the end of the hose against the end wall of the body portion is also disclosed. In that patent, the sleeve is spun or rolled into the hose in only one zone.

I have found that a type of coupling superior for some purposes, such as high pressure applications, may be produced by forming the coupling, as disclosed herein, preferably with an annular recess in the end wall, and by rolling or spinning the sleeve into the hose in two zones, one adjacent the open end of the sleeve and the other adjacent the body portion of the coupling.

Figure 4:
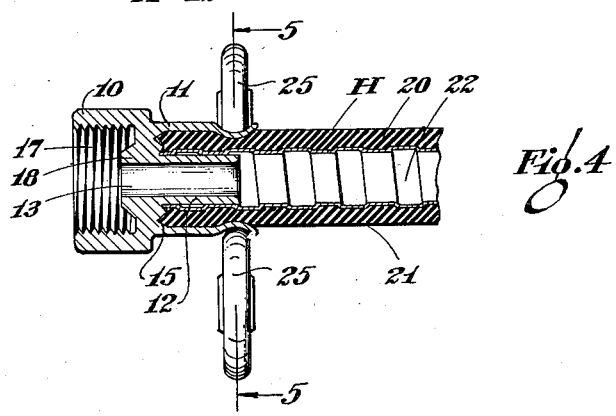
Fig. 4 illustrates the method employed in rolling or spinning in the sleeve of the coupling to secure the hose to the coupling.
Figure 5:
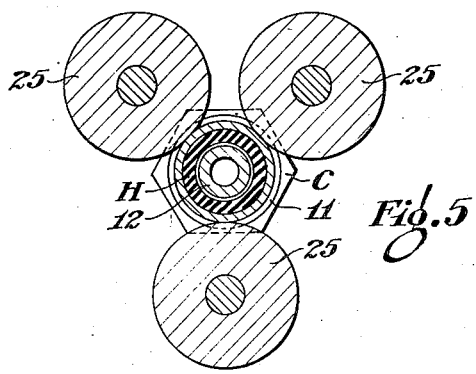
Fig. 5 is a section taken along line 5—5 of Fig. 4.

As illustrated in Fig. 4, the first rolling in operation takes place adjacent the open end of the sleeve. The operation may be carried out by means of a series of rolls 25, as illustrated in Figs. 4 and 5, or if desired the sleeve may be spun into the hose instead of being rolled. The spining or rolling operations are fully described in the above noted Weatherhead Patent No. 2,000,680. The first rolling in operation compresses the hose against its internal metallic lining and forces the lining firmly into engagement with the nipple 12, and also longitudinally crowds the material of the hose against the end wall 14 and causes the material to flow slightly into the annular recess 15.

Thereafter the joint between the hose and coupling is completed by deforming the sleeve inwardly in a zone adjacent the body portion of the coupling. It is to be noted that the end wall preferably lies within the sleeve, while the bottom of the V-shaped recess may be disposed substantially in the plane defined by the juncture of the sleeve with the hexagonal body portion of the coupling. By reason of this arrangement, the deformation of the sleeve adjacent the body portion not only applies further pressure to the material of the hose, which is already somewhat compressed by the first rolling in operation, but also deforms the annular recess 15 by swinging together the walls of the V, thereby pinching the material of the hose between the walls of the V to make a secure and leak proof joint between the end wall and the hose. At the time the sleeve is rolled inwardly in the zone adjacent the body portion, the hose already has been securely clamped by the deformation adjacent the open end of the sleeve, so that the material can not flow away from the end wall but must be compressed thereagainst. By this method, the material of the hose adjacent the body portion of the coupling is compressed to such an extent that no fluid can escape around or penetrate the end of the hose. An adequate degree of compression is assured because there is no possibility of the integrally formed or permanently secured sleeve moving away from the body portion of the fitting. While the rolling operation may lengthen the sleeve if it is measured along its curved surface, nevertheless, the over-all length of the sleeve, measured in a straight line from the base of the annular chamber to the open end of the sleeve, is reduced. By reason of the fact that the friction between the sleeve and the hose is much greater than the friction between the hose and the nipple, the reduction in the over-all length of the sleeve assists in crowding the end of the hose against the end wall of the annular chamber. Thus a tight joint is produced even though the end of the hose may be badly out of square so that only a part touches the end wall before closing it. The groove in the end wall permits a relatively large radial movement of the sleeve, which results in a correspondingly great displacement and compression of the material of the hose.

From the foregoing description of a preferred form of my invention, it will be seen that I have provided a method of securing a hose to a coupling which can be rapidly and economically carried out and which will form a secure mechanical joint between the hose and the coupling and will also form a leak proof fluid tight joint. By reason of the high degree of compression in the material of the hose adjacent the body portion of the coupling, fluid is prevented from escaping past or penetrating the cut end of the hose.

In this specification, I have described a preferred form of my invention in considerable detail. However, those skilled in the art will appreciate that my invention may be modified in various ways without departing from the spirit of my invention, and I therefore do not wish to be limited to the specific form described herein or in any manner other than by the claims appended hereto when given that range of equivalents to which my patent may be entitled.

I claim:

1. A method of joining a lined hose to a coupling having a body portion, an annular chamber formed by an integrally formed sleeve projecting from the body portion and a nipple concentric with the sleeve, and a substantially radial end wall having a V-shaped annular recess therein, including the steps of inserting the end of the hose into the annular chamber, deforming the sleeve inwardly in a zone spaced away from the body portion of the coupling to compress the hose against the nipple and against the radial end wall, and thereafter compressing the hose against the nipple, crowding the material of the hose longitudinally of the coupling into the annular recess, and swinging the walls of the recess together to pinch the material of the hose therein by deforming the sleeve inwardly in a zone adjacent the body portion of the coupling.

2. A method of joining a hose to a coupling having a body portion, an annular chamber formed by an integrally formed sleeve projecting from the body portion and a nipple substantially concentric therewith, and an end wall having an annular recess therein, including the steps of inserting the end of the hose into the annular chamber, deforming the sleeve inwardly in a zone spaced away from the body portion of the coupling to compress the hose against the nipple to retain the hose in the coupling, and thereafter compressing the hose against the nipple, crowding the material of the hose longitudinally of the coupling into the annular recess, and deforming the recess to compress the material of the hose therein by deforming the sleeve inwardly in a zone adjacent the body portion of the coupling.

3. A method of joining a hose to a coupling having a body portion, an annular chamber formed by a sleeve projecting from the body portion and a nipple concentric with the sleeve, and an end wall at the base of the annular chamber; including the steps of inserting the end of the hose into the annular chamber, deforming the sleeve inwardly in a zone spaced from the body portion of the coupling to compress the hose against the nipple and to restrain the hose against movement out of the annular chamber, and thereafter deforming the sleeve inwardly in a zone adjacent the body portion of the coupling to thereby compress the hose against the nipple and crowd the material of the hose longitudinally against the end wall.

4. A method of joining a hose to a coupling having a body portion, a sleeve projecting from the body portion and permanently joined thereto, a nipple concentric with the sleeve, said sleeve and nipple defining an open ended annular chamber, and an end wall at the base of the annular chamber; including the steps of inserting the end of the hose into the annular chamber, deforming the sleeve inwardly in a zone spaced from the body portion of the coupling to compress the hose against the nipple and to restrain the hose against movement out of the annular chamber, and deforming the sleeve inwardly in a zone adjacent the body portion of the coupling, thereby shortening the over-all length of the sleeve and crowding the material of the end of the hose longitudinally against the end wall.

5. A method of joining a hose to a coupling having a body portion, a sleeve projecting from the body portion and permanently joined thereto, a nipple adapted to be inserted within the bore of the hose, and an end wall at the base of the sleeve, including the steps of inserting the end of the hose into the sleeve with the nipple projecting into the bore of the hose, rolling the sleeve inwardly in a zone spaced from the body portion of the coupling to compress the material of the hose wall and to restrain the hose against movement out of the sleeve, and rolling the sleeve inwardly in a zone adjacent the body portion of the coupling to compress and crowd the material of the hose longitudinally against the end wall.

HENRY D. STECHER.